United States Patent
Deng et al.

(10) Patent No.: US 10,603,838 B2
(45) Date of Patent: Mar. 31, 2020

(54) 3D PRINTING SYSTEM

(71) Applicants: Tyco Electronics (Shanghai) Co. Ltd., Shanghai (CN); TE Connectivity Corporation, Berwyn, PA (US)

(72) Inventors: Yingcong Deng, Shanghai (CN); Liming Xin, Shanghai (CN); Dandan Zhang, Shanghai (CN); Roberto Francisco-Yi Lu, Shanghai (CN); Lvhai Hu, Shanghai (CN); Yun Liu, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 161 days.

(21) Appl. No.: 15/441,871

(22) Filed: Feb. 24, 2017

(65) Prior Publication Data

US 2017/0165915 A1    Jun. 15, 2017

Related U.S. Application Data

(63) Continuation of application No. PCT/IB2015/055707, filed on Jul. 29, 2015.

(30) Foreign Application Priority Data

Aug. 26, 2014 (CN) .......................... 2014 1 0424240

(51) Int. Cl.
*B29C 67/00* (2017.01)
*B33Y 30/00* (2015.01)
(Continued)

(52) U.S. Cl.
CPC ............ *B29C 64/20* (2017.08); *B29C 64/106* (2017.08); *B29C 64/245* (2017.08); *B33Y 30/00* (2014.12); *B29C 64/241* (2017.08)

(58) Field of Classification Search
CPC ..... B29C 64/106; B29C 64/20; B29C 64/112; B29C 64/245; B29C 64/241; B33Y 30/00; B33Y 40/00
See application file for complete search history.

(56) References Cited

U.S. PATENT DOCUMENTS

| | | | |
|---|---|---|---|
| 5,764,521 A | 6/1998 | Batchelder et al. | |
| 7,168,935 B1* | 1/2007 | Taminger ........... | B23K 15/0073 219/121.12 |

(Continued)

OTHER PUBLICATIONS

Notification, PCT International Preliminary Report on Patentability and Written Opinion, dated Mar. 9, 2017, 8 pages.

(Continued)

*Primary Examiner* — Joseph S Del Sole
*Assistant Examiner* — Jerzi H Moreno Hernandez
(74) *Attorney, Agent, or Firm* — Barley Snyder

(57) ABSTRACT

A 3D printing system is disclosed. The 3D printing system has a print head and a positioning platform. The positioning platform supports and positions a product printed by the print head. The positioning platform is movable with respect to the print head in a first direction, a second direction, and a third direction perpendicular to each other. The positioning platform is also rotatable with respect to the print head about at least two of the first, second, and third directions.

8 Claims, 1 Drawing Sheet

(51) Int. Cl.
 *B29C 64/20* (2017.01)
 *B29C 64/106* (2017.01)
 *B29C 64/245* (2017.01)
 *B29C 64/241* (2017.01)

(56) References Cited

U.S. PATENT DOCUMENTS

| | | | | |
|---|---|---|---|---|
| 2001/0019340 A1* | 9/2001 | Kubo | ................... | B41J 2/01 347/1 |
| 2009/0073200 A1* | 3/2009 | Tezuka | ................... | B33Y 30/00 347/9 |
| 2012/0251688 A1* | 10/2012 | Zimmerman | ................... | A23G 1/206 426/383 |
| 2013/0015596 A1* | 1/2013 | Mozeika | ................... | B25J 9/0084 264/40.1 |
| 2014/0197576 A1* | 7/2014 | Kraibuhler | ................... | B33Y 10/00 264/308 |
| 2014/0232035 A1* | 8/2014 | Bheda | ................... | B29C 64/106 264/148 |
| 2015/0110912 A1* | 4/2015 | Okamura | ................... | B33Y 30/00 425/162 |
| 2015/0239178 A1* | 8/2015 | Armstrong | ................... | B33Y 30/00 700/98 |
| 2015/0307385 A1* | 10/2015 | Klein | ................... | C03B 25/02 65/29.11 |
| 2017/0217100 A1* | 8/2017 | Gardiner | ................... | B33Y 10/00 |

OTHER PUBLICATIONS

PCT Search Report and Written Opinion, dated Nov. 13, 2015, 8 pages.

* cited by examiner

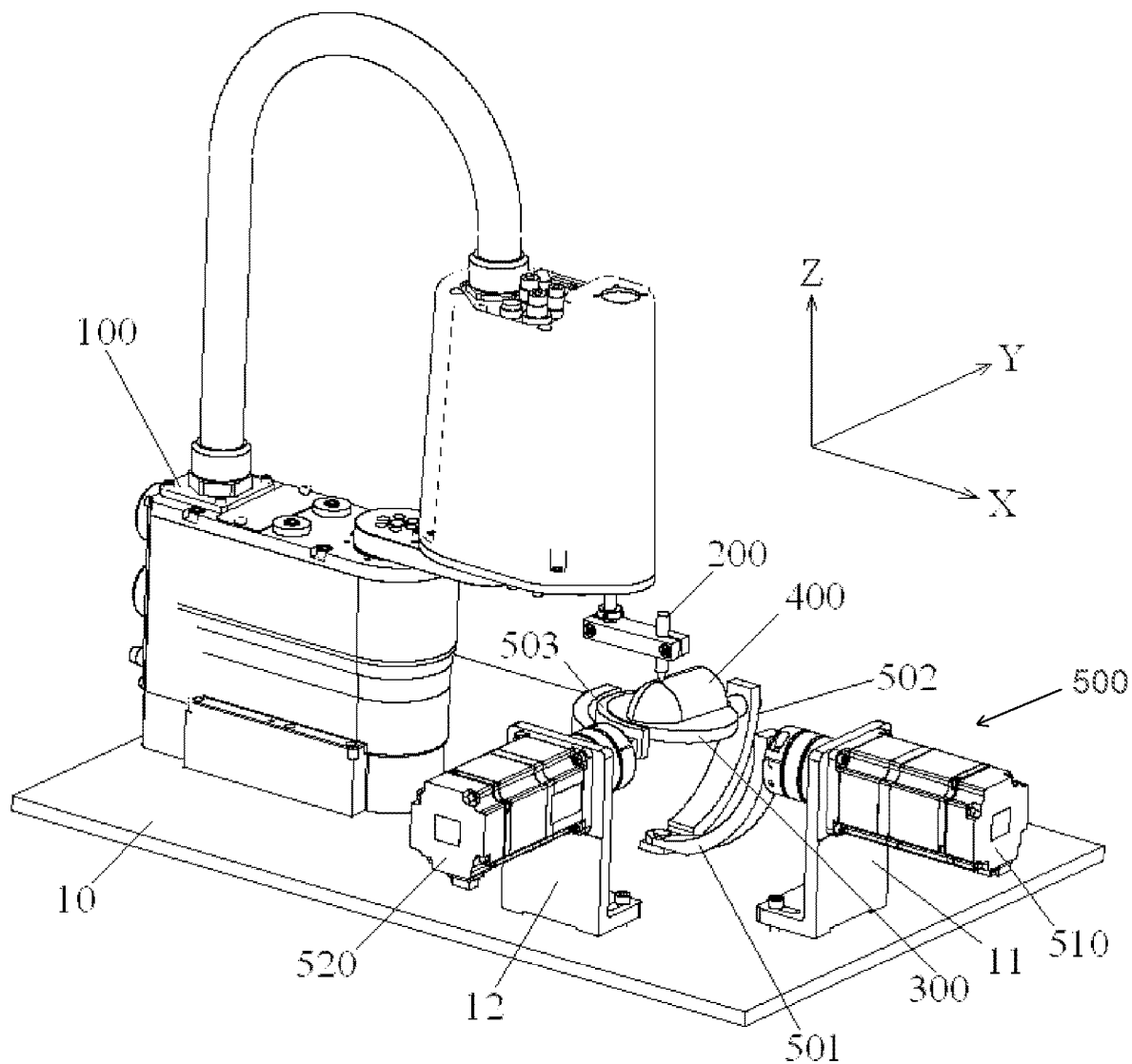

3D PRINTING SYSTEM

CROSS-REFERENCE TO RELATED APPLICATIONS

This application is a continuation of PCT International Application No. PCT/IB2015/055707, filed on Jul. 29, 2015, which claims priority under 35 U.S.C. § 119 to Chinese Patent Application No. 201410424240.4, filed on Aug. 26, 2014.

FIELD OF THE INVENTION

The present invention relates to a printing system, and more particularly, to a three-dimensional (3D) printing system.

BACKGROUND

In the prior art, 3D printing systems generally include a robot and a print head mounted on an end of the robot. Materials are sprayed or deposited from the print head onto a positioning platform, forming a product having a desired shape on the positioning platform as the robot moves the print head based on a predetermined route. 3D printing is thus fundamentally different from conventional machining; in 3D printing, a desired shape is created by adding materials instead of removing materials as in machining.

In the prior art, the robot for manipulating the print head can only move in X, Y and Z directions perpendicular to each other and the positioning platform for supporting the product made from the materials is stationary. Additionally, the product to be printed is divided into a plurality of two-dimensional (2D) horizontal layers in the Z direction. The robot manipulates the printing head to move in a horizontal plane defined by X and Y to print the plurality of 2D horizontal layers successively. The end product is created by successively overlaying the plurality of 2D horizontal layers in the Z direction.

Since such existing 3D printing systems only move in X, Y and Z directions perpendicular to each other, only the position of the print head may be adjusted with respect to the positioning platform. The angle of the print head with respect to the positioning platform cannot be adjusted. Therefore, in such existing 3D printing systems, the print head only can be moved over a 2D plane or a 2D curve, rather than a 3D curved surface or a 3D curve, thus limiting its usage.

SUMMARY

An object of the invention, among others, is to provide a 3D printing system in which the print head may be moved over a 3D curved surface or a 3D curve. The 3D printing system has a print head and a positioning platform. The positioning platform supports and positions a product printed by the print head. The positioning platform is movable with respect to the print head in a first direction, a second direction, and a third direction perpendicular to each other. The positioning platform is also rotatable with respect to the print head about at least two of the first, second, and third directions.

BRIEF DESCRIPTION OF THE DRAWINGS

The invention will now be described by way of example with reference to the accompanying FIGURE, of which:

FIG. 1 is a perspective view of a 3D printing system according to the invention.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A 3D printing system according to the invention is shown generally in FIG. 1. The 3D printing system comprises a robot 100, a print head 200, a positioning platform 300, and a movement device 500. As shown in FIG. 1, a first direction X and a second direction Y define a horizontal plane, and a third direction Z refers to a vertical direction perpendicular to the horizontal plane.

The robot 100 has at least three degrees of freedom. The robot 100 may be, for example, a planar articulated robot, a six-axis robot, a Cartesian coordinate robot, a serial robot, a parallel robot or a serial-parallel robot.

The movement device 500, as shown in FIG. 1, is a spherical movement device comprising a first rotation drive 510, a second rotation drive 520, a first link 501, a second link 502, and a third link 503. The first rotation device 510 has an output shaft rotating about the first direction X. The second rotation drive 520 has an output shaft rotating about the second direction Y perpendicular to the first direction X. The first link 501 has a first end connected to the output shaft of the first rotation drive 510. The second link 502 has a first end pivotally connected to the positioning platform 300 and an opposite second end pivotally connected to a second end of the first link 501. The third link 503 has a first end connected to the output shaft of the second rotation drive 520 and an opposite second end pivotally connected to the positioning platform 300. In the shown embodiment, each of the first link 501, second link 502, and third link 503 is shaped as a quarter-arc.

A pivotal axis at a joint of the first link 501 and the second link 502, a pivotal axis at a joint of the second link 502 and the positioning platform 300, a pivotal axis at a joint of the third link 503 and the positioning platform 300, an axis of the output shaft of the first rotation drive 510, and an axis of the output shaft of the second rotation drive 520 intersect at a same point located at a geometric center of the positioning platform 300.

The first rotation drive 510 and the second rotation drive 520, as shown in FIG. 1, are mounted on a first vertical mounting plate 11 and a second vertical mounting plate 12, respectively. The first vertical mounting plate 11 and the second vertical mounting plate 12 are mounted on a base 10. The first rotation drive 510 and the second rotation drive 520 may each comprise a motor.

In another embodiment, the movement device 500 is a multi-freedom robot such as a planar articulated robot, a six-axis robot, a Cartesian coordinate robot, a serial robot, a parallel robot or a serial-parallel robot.

As shown in FIG. 1, the robot 100 and the movement device 500 are mounted on the base 10. The print head 200 is mounted on an end of the robot 100. The positioning platform 300 is mounted on the movement device 500.

The use of the 3D printing system according to the invention will now be described in greater detail.

The robot 100 is adapted to move the print head 200 in the first direction X, the second direction Y, and the third direction Z perpendicular to each other, so as to print a desired product on the positioning platform 300 by the print head 200. Materials 400 are deposited from the print head 200 onto the positioning platform 300 as the robot 100 moves the print head 200 to form the product. The materials 400 may be provided by a material supply unit mounted on the end of the robot 100 adjacent the print head 200. Alternatively, the materials 400 may be provided by a remote material supply unit spaced apart from the robot 100.

The movement device 500 is adapted to drive the positioning platform 300 to rotate about the first direction X and the second direction Y perpendicular to the first direction X while the materials 400 are deposited. Thus, the angle of the print head 200 with respect to the positioning platform 300 may be adjusted. With the cooperation of the movement device 500 and the robot 100, the print head 200 may move over a 3D curved surface or a 3D curve with respect to the positioning platform 300 and/or materials 400 provided on the positioning platform 300.

In an embodiment, the entire product is formed by the 3D printing system. Alternatively, a blank may be previously formed as one portion of the product by means of non-3D printing, for example, by means of casting, and the other portion of the product is then formed on the blank by the 3D printing system.

In another embodiment, the print head 200 is stationary and the movement device 500 drives the positioning platform 300 to move in the first direction X, the second direction Y, and the third direction Z perpendicular to each other, and to rotate about at least two of the first direction X, the second direction Y, and the third direction Z. That is, in this embodiment, the movement device 500 has at least five degrees of freedom.

In another embodiment, the print head 200 is stationary and the movement device 500 drives the positioning platform 300 to move in the first direction X, the second direction Y, and the third direction Z perpendicular to each other, and to rotate about the first direction X, the second direction Y, and the third direction Z. That is, in this embodiment, the movement device 500 has at least six degrees of freedom.

What is claimed is:

1. A 3D printing system, comprising:
   a print head;
   a positioning platform supporting and positioning a product printed by the print head;
   a robot connected to the print head and configured to move the print head with respect to the positioning platform in a first direction, a second direction, and a third direction perpendicular to each other; and
   a movement device on which the positioning platform is mounted, the movement device configured to rotate the positioning platform with respect to the print head about at least two of the first, second, and third directions, the movement device having:
      a first rotation drive with an output shaft rotating about the first direction;
      a second rotation drive with an output shaft rotating about the second direction;
      a first link with a first end connected to the output shaft of the first rotation drive;
      a second link with a first end pivotally connected to the positioning platform and an opposite second end pivotally connected to a second end of the first link; and
      a third link with a first end connected to the output shaft of the second rotation drive and an opposite second end pivotally connected to the positioning platform.

2. The 3D printing system of claim 1, wherein the robot is a planar articulated robot, a six-axis robot, a Cartesian coordinate robot, a serial robot, a parallel robot, or a serial-parallel robot.

3. The 3D printing system of claim 1, wherein each of the first link, the second link, and the third link is shaped as a quarter-arc.

4. The 3D printing system of claim 1, wherein a first pivotal axis at a joint of the first link and the second link, a second pivotal axis at a joint of the second link and the positioning platform, a third pivotal axis at a joint of the third link and the positioning platform, a first axis of the output shaft of the first rotation drive, and a second axis of the output shaft of the second rotation drive intersect at a same point.

5. The 3D printing system of claim 4, wherein the same point is located at a geometric center of the positioning platform.

6. The 3D printing system of claim 5, wherein the first rotation drive is mounted on a first vertical mounting plate mounted on a base and the second rotation drive is mounted on a second vertical mounting plate mounted on the base.

7. The 3D printing system of claim 1, wherein the movement device and the robot are mounted on a base.

8. The 3D printing system of claim 1, wherein the output shaft of the first rotation drive and the output shaft of the second rotation drive are each indirectly connected to the positioning platform.

* * * * *